(12) United States Patent
Pancotti

(10) Patent No.: US 7,850,429 B2
(45) Date of Patent: Dec. 14, 2010

(54) HELICOPTER ROTOR

(75) Inventor: Santino Pancotti, Gallarate (IT)

(73) Assignee: Agusta S.p.A., Samarate (IT)

( * ) Notice: Subject to any disclaimer, the term of this patent is extended or adjusted under 35 U.S.C. 154(b) by 442 days.

(21) Appl. No.: 11/233,820

(22) Filed: Sep. 22, 2005

(65) Prior Publication Data

US 2006/0067823 A1 Mar. 30, 2006

(30) Foreign Application Priority Data

Sep. 28, 2004 (EP) .................................. 04425726

(51) Int. Cl.
*B64C 27/50* (2006.01)

(52) U.S. Cl. ................ 416/131; 416/134 A; 416/132 R; 416/135; 416/141

(58) Field of Classification Search .................. 416/131, 416/134 A, 132 R, 135, 141
See application file for complete search history.

(56) References Cited

U.S. PATENT DOCUMENTS

| 4,012,169 | A | * | 3/1977 | Mouille et al. | .......... | 416/134 A |
| 4,257,739 | A | * | 3/1981 | Covington et al. | ...... | 416/134 A |
| 4,268,222 | A | * | 5/1981 | Bernard | .......................... | 416/1 |
| 5,110,260 | A | * | 5/1992 | Byrnes et al. | ............ | 416/134 A |
| 5,407,325 | A | | 4/1995 | Aubry et al. | | |

FOREIGN PATENT DOCUMENTS

DE 28 27 320 A 1/1980
GB 1528226 10/1978

* cited by examiner

*Primary Examiner*—Igor Kershteyn
(74) *Attorney, Agent, or Firm*—Mitchell P. Brook; Luce, Forward, Hamilton & Scripps

(57) ABSTRACT

There is described a rotor for a helicopter, having a hub rotating about a first axis; a number of blades projecting from the hub in respective longitudinal directions lying in a plane crosswise to the first axis, and each connected to the hub so as to be movable at least about a second axis crosswise to the first axis and to the relative longitudinal direction; and a number of damping devices for damping vibration of the helicopter, each interposed between a respective blade and the hub; each damping device has a plate member fixed, on one side, to the hub, elastically connected, on the opposite side, to the relative blade, and flexible, during movement of the blade, about a third axis coaxial with the second axis.

13 Claims, 3 Drawing Sheets

HELICOPTER ROTOR

The present invention relates to a helicopter rotor of the type substantially comprising a hub connected to a drive shaft to rotate the rotor; and a number of blades fixed to and projecting radially from the hub.

BACKGROUND OF THE INVENTION

More specifically, each blade extends lengthwise substantially radially, is rotated, in use, by the hub in a drive plane perpendicular to the axis of the drive shaft, and is movable in all planes with respect to the hub to manoeuvre the helicopter.

Established helicopter design criteria require that, for each operating condition of the helicopter, the work frequencies of the rotor and blades fall within a different range from that of the natural frequencies of the other component parts of the helicopter.

If such is not the case, the helicopter may be subjected to particularly severe, even destructive, vibration.

In helicopter design, appropriate setting of said natural frequencies is therefore essential; for which purpose, vibration damping devices are known to be interposed between the hub and each blade, either inwards or outwards of the blades.

Location of the damping device outwards of the blades produces additional aerodynamic drag which impairs performance and consumption of the helicopter.

To reduce such drag, the damping devices must be made as small as possible. By so doing, however, the loads acting on the rotor may induce severe stress on, and even cause detachment of, the damping devices, thus resulting in malfunctioning of the rotor and possibly additional stress on the helicopter, making it difficult to manoeuvre.

Moreover, if detached, the damping device may hit the helicopter rotor, with obvious consequences in terms of safety.

Conversely, location of the damping device inwards of the blade poses problems caused by the damping device interacting with the portion of the blade connected to the hub, and by sliding movements between the contacting parts.

More specifically, such sliding movements may produce wear and localized heating of the contacting parts, thus reducing the working life of the parts and dissipating energy at the expense of the efficiency of the helicopter.

Location of the damping devices inwards of the blades also poses size problems, making it necessary at times to redesign the rotor hub.

SUMMARY OF THE INVENTION

It is an object of the present invention to provide a helicopter rotor designed to eliminate at least some of the aforementioned drawbacks in a straightforward, low-cost manner.

According to the present invention, there is provided a helicopter rotor as claimed in the attached claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
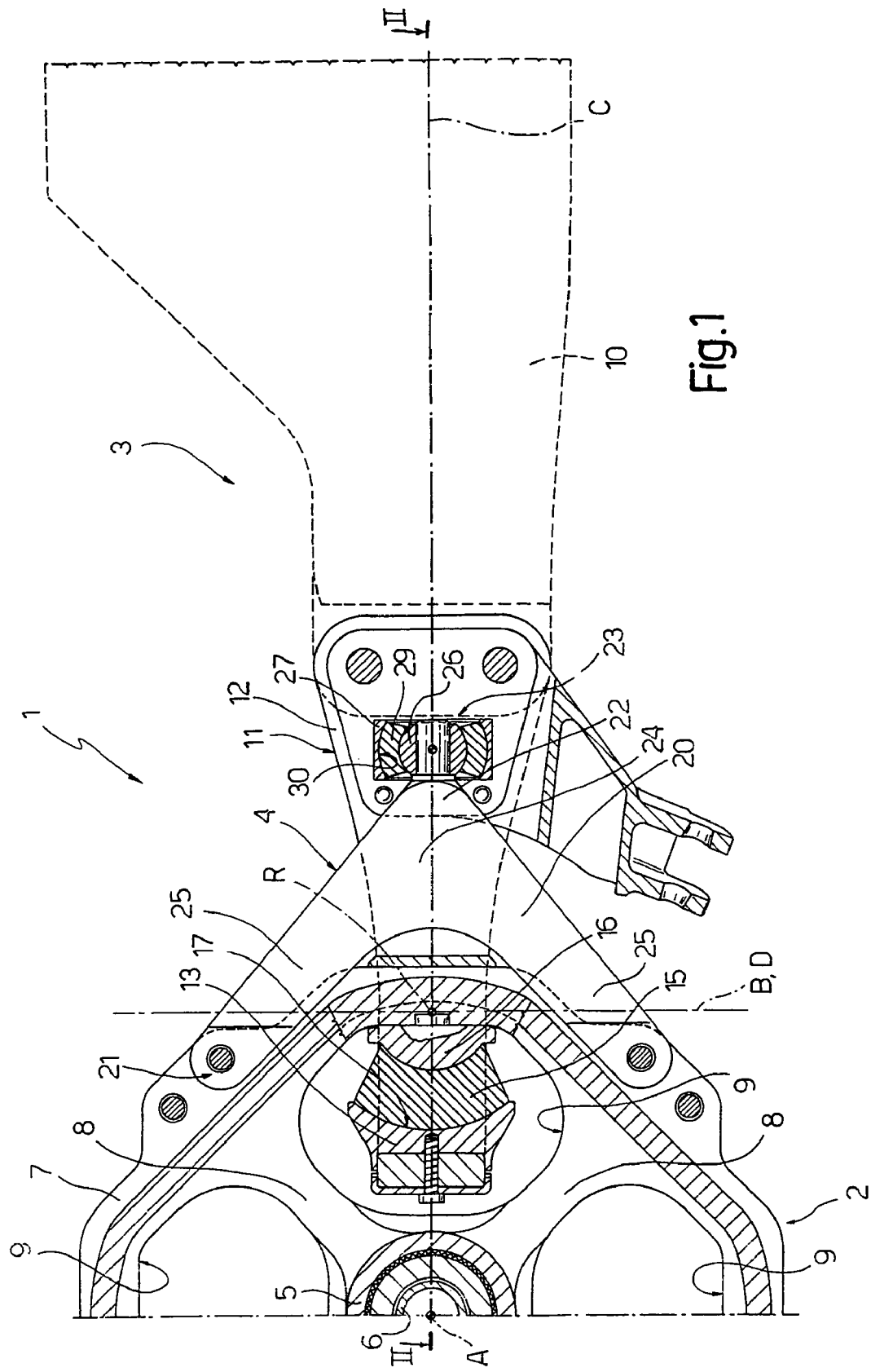
FIG. 1 shows a partial longitudinal section of a helicopter rotor in accordance with the present invention.

Number 1 in the accompanying drawings indicates as a whole a rotor, for a helicopter (not shown), substantially comprising a hub 2 of axis A; a number of blades 3 (only one shown in detail) projecting substantially radially from hub 2; and a number of damping devices 4 (only one shown in detail), each interposed between a respective blade 3 and hub 2 to reduce the vibration induced on the helicopter by rotor 1.

More specifically, hub 2 comprises a radially inner cylindrical body 5, of axis A, for housing a drive shaft 6 of rotor 1; and a radially outer tubular portion 7 having a curved polygonal profile and connected to cylindrical body 5 by a number of angularly equally spaced radial spokes 8.

In other words, hub 2 comprises a number of through seats 9, of axis A, equally spaced about axis A and by which to attach respective blades 3.

More specifically, each seat 9 is bounded circumferentially by two adjacent spokes 8, and radially by cylindrical body 5 and tubular portion 7.

As shown in the accompanying drawings, each blade 3 extends predominantly in a direction C substantially radial with respect to axis A, and comprises a main body 10 (shown only partly in the accompanying drawings) defining the helicopter lift/flight surfaces; and a coupling member 11 bolted to a radially inner end of main body 10 to connect blade 3 to hub 2.

More specifically, coupling member 11 of each blade 3 is substantially C-shaped, and comprises two parallel arms 12, between which the radially inner end of main body 10 of blade 3 is fixed; and a connecting portion 13 connecting arms 12 and which engages a respective seat 9 of hub 2.

More specifically, connecting portion 13 of coupling member 11 of each blade 3 engages a respective seat 9 of hub 2 with the interposition of a bearing 15 allowing blade 3 to move in all possible planes in space about a centre of rotation R.

More specifically, each bearing 15 is housed between a convex circumferential projection 16 formed on tubular portion 7 of hub 2 at relative seat 9, and a concave recess 17 complementary in shape and formed on connecting portion 13 of coupling member 11 of relative blade 3.

As shown clearly in the accompanying drawings, each projection 16 on tubular portion 7 of hub 2 faces axis A, while each recess 17 is formed on the side of connecting portion 13 of relative blade 3 facing away from axis A.

Given the construction arrangement described above, each blade 3 can be rotated integrally with hub 2 in a plane perpendicular to axis A, and is movable with respect to hub 2 about centre of rotation R.

More specifically, of all the possible movements of each blade 3, the most significant, for a clear understanding of the present invention, is that about an axis B extending through centre of rotation R and perpendicular to axis A and direction C. The other known possible movements of blades 3 are not described for the sake of simplicity.

Figure 2:
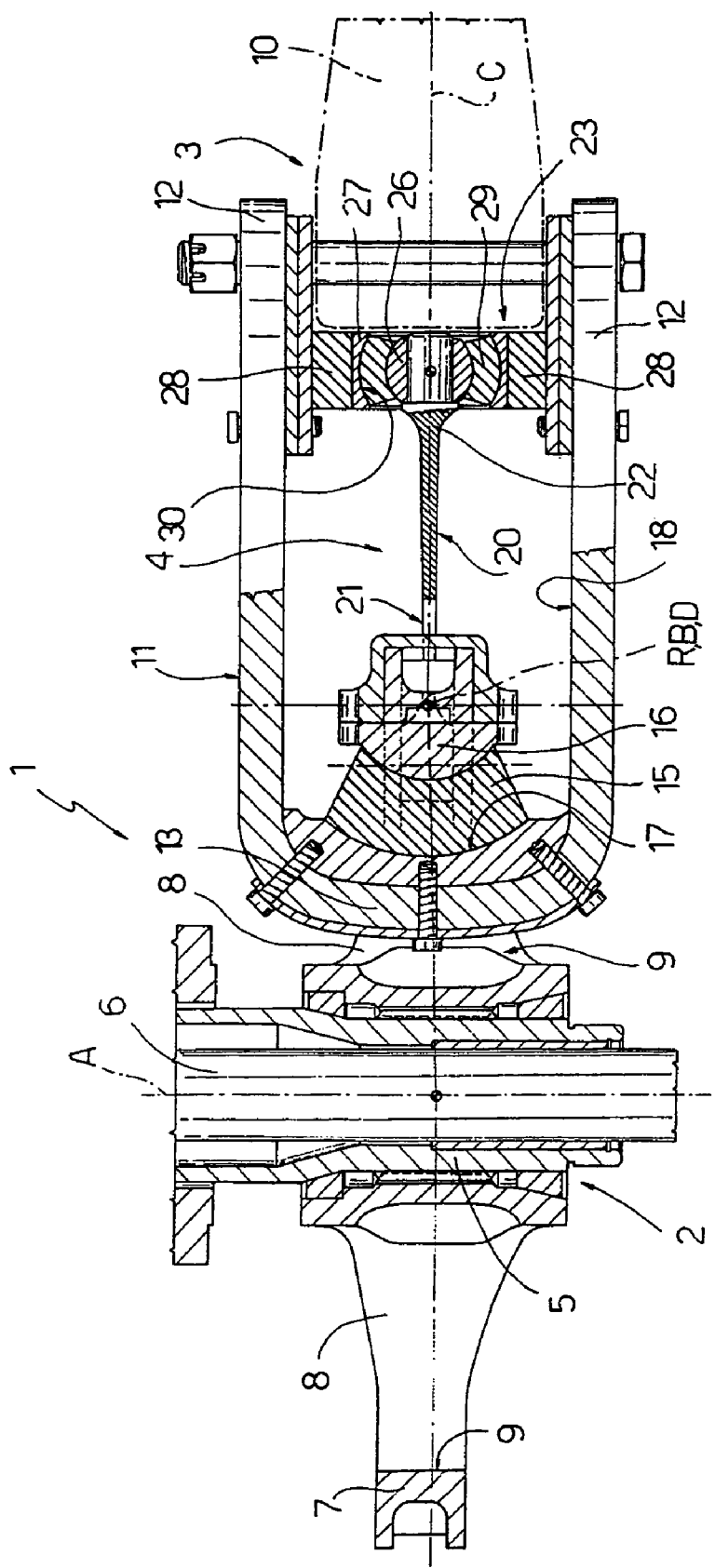
FIGS. 2 and 3 show smaller-scale sections, along line II-II in FIG. 1, of the rotor in two different operating conditions.
Figure 3:
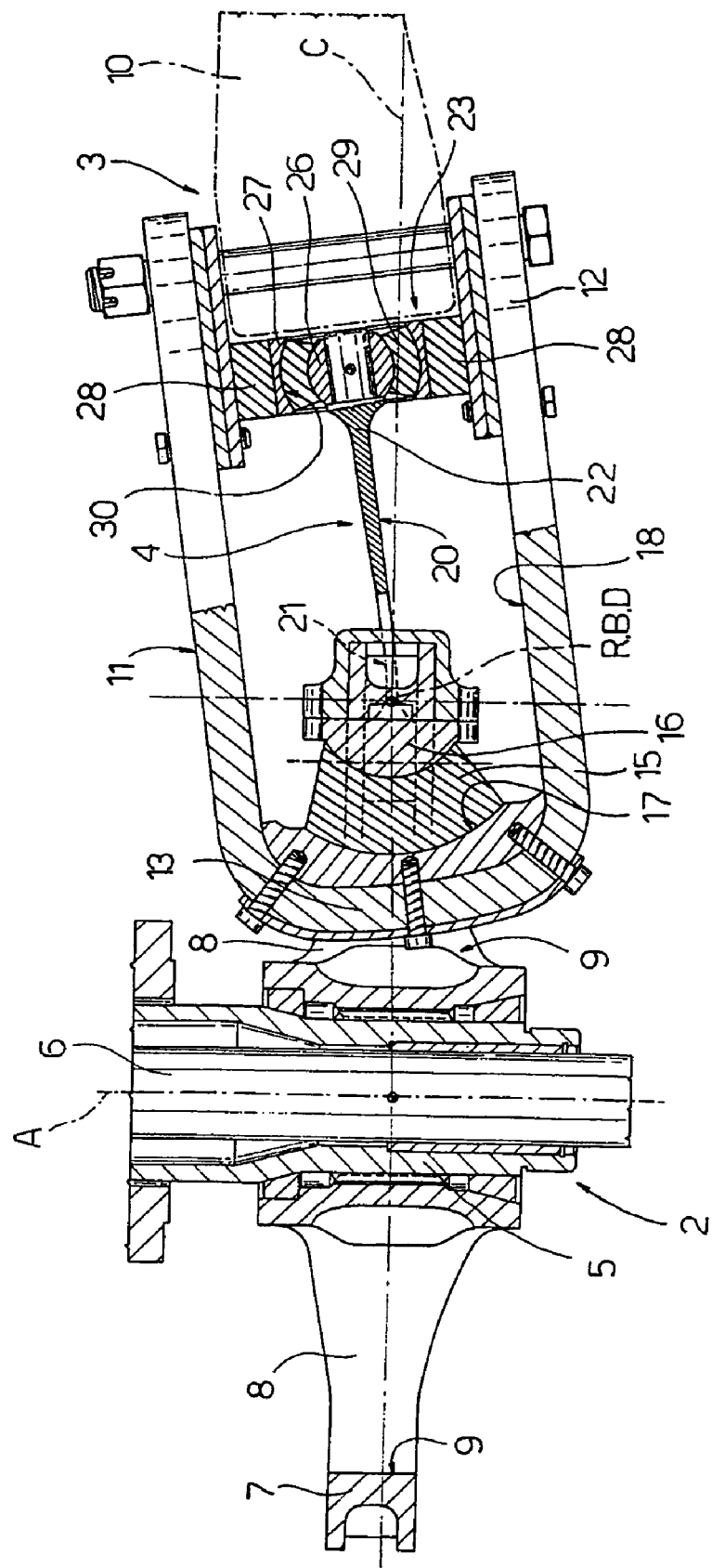

As shown in FIGS. 2 and 3, each damping device 4 is housed between arms 12 of coupling member 11 of relative blade 3, and is secured, on one side, to arms 12, and, on the opposite side, to tubular portion 7 of hub 2.

More specifically, each damping device 4 is enclosed between arms 12 in a direction parallel to axis A, and is enclosed radially between tubular portion 7 of hub 2 and the radially inner end of main body 10 of relative blade 3. In other words, each coupling member 11 defines a frame-like portion, of relative blade 3, in turn defining a seat 18 open in a direction parallel to axis B and for housing a relative damping device 4.

Each damping device 4 advantageously comprises a plate member 20, the radially inner end 21 of which, with respect to axis A, is fixed to tubular portion 7 of hub 2, and the radially outer end 22 of which, with respect to axis A, is secured to arms 12 of coupling member 11 of relative blade 3 by means of a connecting member 23 made partly of elastic material.

More specifically, plate member 20 is V-shaped, lies in a plane parallel to arms 12 of coupling member 11 of relative blade 3, and is symmetrical with respect to direction C.

More specifically, plate member 20 comprises a tip portion 24, from which originate two diverging lateral branches 25.

Tip portion 24 defines end 22 of plate member 20, while the free ends of lateral branches 25 together define end 21 connecting plate member 20 to tubular portion 7 of hub 2.

Tip portion 24 of plate member 20 has an end ball 26 connected to connecting member 23 to define an articulated joint as explained in detail later on.

More specifically, connecting member 23 comprises a parallelepiped-shaped supporting member 27 fixed between the free ends of arms 12, with the interposition of respective pads 28 of elastomeric material, and defining a spherical seat 30 for housing ball 26 of plate member 20 with the interposition of a bearing 29 also made of elastomeric material.

As shown particularly in FIG. 1, lateral branches 25 are fixed peripherally to tubular portion 7 of hub 2, and define, together with tip portion 24, a cavity for receiving part of tubular portion 7; which construction arrangement provides for limiting the overall size of rotor 1 radially with respect to axis A.

An important characteristic of the present invention is that, during movement of relative blade 3, plate member 20 is flexible about an axis D coaxial with axis B.

Axes D and B being coaxial, no sliding movements occur, as each blade 3 rotates about axis B, between relative plate member 20 and the parts connecting plate member 20 to hub 2 and blade 3, thus drastically reducing wear and localized heating.

In an alternative embodiment not shown, the same results may also be achieved with axis D located close to and parallel to axis B. More specifically, axis D may be located at a distance from axis B equal to no more than 10%, and preferably within 5%, of the total length of plate member 20 in direction C.

Further advantages of rotor 1 as described and illustrated herein are indicated below.

In particular, being V-shaped, each plate member 20 is far more resistant to bending moments operating in a plane defined by axis A and relative direction C, and to shear forces perpendicular to direction C.

In fact, each plate member 20 has a cross section, crosswise to the plane of plate member 20, characterized by decreasing in area and moment of inertia from axis A towards relative connecting member 23.

The resistance of plate member 20 to said bending moments is therefore optimized, by the sections close to axis D, and therefore subjected to greater stress by the bending loads on blade 3, having a greater moment of inertia.

Similarly, close to axis A, the resistance of plate member 20 to shear stress is improved, by plate member 20 having larger-area sections close to axis A.

Each damping device 4 is therefore characterized by being smaller in overall size radially with respect to axis A, and by improved resistance to external stress as compared with known solutions.

Moreover, if detached accidentally from rotor 1, each damping device 4 remains inside relative seat 18, and is prevented from escaping from relative blade 3 and possibly colliding with rotor 1.

In other words, in the above conditions, malfunctioning of rotor 1 and additional stress on the helicopter are therefore reduced.

Finally, housing each damping device 4 inside a closed seat 18 defined by relative blade 3 produces no additional aerodynamic drag, thus improving performance and consumption of the helicopter.

Clearly, changes may be made to rotor 1 as described and illustrated herein without, however, departing from the scope defined by the accompanying claims.

The invention claimed is:

1. A rotor for a helicopter, comprising:
   a hub rotating about a first axis, the hub comprising a radially inner cylindrical body and a radially outer tubular portion;
   a number of blades projecting from said hub in respective longitudinal directions lying in a plane crosswise to said first axis, each of said number of blades being connected to said hub so as to be movable at least about a second axis crosswise to said first axis and to one of said respective longitudinal directions; and
   a number of damping devices for damping vibration of said helicopter, and each interposed between one blade and said tubular portion of said hub;
   characterized in that each said number of damping devices comprises a separate plate member fixed, on one side, to said hub, and connected, on an opposite side, to said blade by elastic means; and in that said separate plate member, during movement of said blade, is flexible about a third axis parallel to said second axis and located close to the second axis;
   each said plate member being V-shaped, and comprising:
      a tip connected to the relative said blade;
      two diverging lateral branches originating from said tip; and
      an end, opposite to said tip, the tip being defined by free ends of said lateral branches and being connected to said tubular portion of said hub;
   said lateral branches of each said plate member being spaced from each other and defining together with said tip a cavity for receiving part of said tubular portion of said hub.

2. A rotor as claimed in claim 1, characterized in that said third axis is coaxial with said second axis.

3. A rotor as claimed in claim 2 characterized in that said hub remains substantially unbent about said second axes and third axes, during movement of each said blade and each said plate member respectively about respective said second and third axis.

4. A rotor as claimed in claim 1, characterized in that said plate member is connected to said elastic means by an articulated connection.

5. A rotor as claimed in claim 4 characterized in that said hub remains substantially unbent about said second axes and third axes, during movement of each said blade and each said plate member respectively about respective said second and third axis.

6. A rotor as claimed in claim 1, characterized in that said plate member is V-shaped, the tip of which is connected to the relative said blade, and the end of which, opposite said tip, is connected to said hub.

7. A rotor as claimed in claim 6, characterized in that said plate member is fixed peripherally to said hub, and defines a cavity for receiving part of the hub.

8. A rotor as claimed in claim 7 characterized in that said hub remains substantially unbent about said second axes and third axes, during movement of each said blade and each said plate member respectively about respective said second and third axis.

9. A rotor as claimed in claim 6 characterized in that said hub remains substantially unbent about said second axes and third axes, during movement of each said blade and each said plate member respectively about respective said second and third axis.

10. A rotor as claimed in claim 1, characterized in that said blade comprises, close to said hub, a frame-like portion defining a seat for housing a relative said damping device.

11. A rotor as claimed in claim 10 characterized in that said hub remains substantially unbent about said second axes and third axes, during movement of each said blade and each said plate member respectively about respective said second and third axis.

12. A rotor as claimed in claim 1 characterized in that said hub remains substantially unbent about said second axes and third axes, during movement of each said blade and each said plate member respectively about respective said second and third axis.

13. A rotor for a helicopter, comprising:
   a hub rotating about a first axis, the hub comprising a radially inner cylindrical body and a radially outer tubular portion;
   a number of blades projecting from said hub in respective longitudinal directions lying in a plane crosswise to said first axis, each said blade being connected to said hub so as to be movable at least about a second axis crosswise to said first axis and to the relative said longitudinal direction; and
   a number of damping devices for damping vibration of said helicopter, and each interposed between a respective said blade and said tubular portion of said hub;
   characterized in that each said damping device comprises a separate plate member fixed, on one side, to said hub, and connected, on the opposite side, to the relative said blade by elastic means; in that said plate member, during movement of said blade, is flexible about a third axis parallel to said second axis and located close to the second axis; and in that said hub remains substantially unbent about said second axes and third axes, during movement of each said blade and each said plate member respectively about respective said second and third axis;
   each said plate member being V-shaped, and comprising:
      a tip connected to the relative said blade;
      two diverging lateral branches originating from said tip; and
      an end, opposite to said tip, the tip being defined by free ends of said lateral branches and being connected to said tubular portion of said hub;
   said lateral branches of each said plate member being spaced from each other and defining together with said tip a cavity for receiving part of said tubular portion of said hub.

* * * * *